(12) United States Patent
Hennecken et al.

(10) Patent No.: US 7,675,710 B2
(45) Date of Patent: Mar. 9, 2010

(54) TAPE DRIVE WITH READ/WRITE HEAD HAVING LEGACY READ ELEMENTS AND WITH SPECIAL-PURPOSE READ CHANNELS

(75) Inventors: Mark Hennecken, Denver, CO (US); Matthew Wojciechowski, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 939 days.

(21) Appl. No.: 11/448,221

(22) Filed: Jun. 7, 2006

(65) Prior Publication Data

US 2007/0285838 A1     Dec. 13, 2007

(51) Int. Cl.
*G11B 5/39* (2006.01)
(52) U.S. Cl. ............................................. 360/129
(58) Field of Classification Search .................. None
See application file for complete search history.

(56) References Cited

U.S. PATENT DOCUMENTS

| | | | |
|---|---|---|---|
| 5,541,793 A * | 7/1996 | Schwarz | 360/121 |
| 5,963,400 A * | 10/1999 | Cates et al. | 360/317 |
| 6,496,329 B2 * | 12/2002 | Hungerford et al. | 360/121 |
| 6,754,034 B2 | 6/2004 | Cumpson | |
| 6,826,020 B2 * | 11/2004 | Daby et al. | 360/317 |
| 6,891,695 B1 | 5/2005 | Falace et al. | |
| 6,970,314 B2 * | 11/2005 | Watson et al. | 360/53 |
| 7,006,317 B1 | 2/2006 | Hennecken et al. | |

* cited by examiner

*Primary Examiner*—Mark Blouin
(74) *Attorney, Agent, or Firm*—Marsh Fischmann & Breyfogle LLP; Libby A. Huskey; Kent A. Lembke

(57) ABSTRACT

A tape drive for reading both new technology tapes and legacy tapes. The tape drive includes a three bump head with two outer read bumps and an inner write bump. The outer read bumps include readers for reading data from tracks of a first width on a first storage tape while the inner write bump includes writers for writing data in tracks of the first storage tape. Legacy readers are provided in the head to read data from tracks of a second width that is greater than the first track width on a second storage tape. The legacy readers are provided by piggybacking or merged-pole techniques in the inner write bump or are provided in one or both of the outer read bumps. The tape drive includes control circuitry with channels for processing data signals from the narrower readers and channels for processing data signals from the wider legacy readers.

19 Claims, 6 Drawing Sheets

US 7,675,710 B2

TAPE DRIVE WITH READ/WRITE HEAD HAVING LEGACY READ ELEMENTS AND WITH SPECIAL-PURPOSE READ CHANNELS

BACKGROUND OF THE INVENTION

1. Field of the Invention

The present invention relates, in general, to tape drives utilizing thin film magnetic heads for reading and writing data to magnetic storage medium (e.g., tape in cartridges), and, more particularly, to tape drives with magnetic heads that are useful for reading from and writing to tape using a new or present technology and its protocols while also being able to read legacy tapes that were written to with a prior or legacy technology and its protocols.

2. Relevant Background

In today's society, the need for storage of data in a secure and retrievable manner has continued to grow and likely will become even more important. There is a need not only to store data such as financial, health, and other information inexpensively but also such that it can be retrieved or read months or years from now such as to allow a company to recover from a loss of data caused by a natural disaster or technical failure. To this end, the data storage industry often stores data on disk or optical media for short term data storage and to magnetic tape or tape cartridges for long term storage or archive. Due to legal and other data retention requirements, it is desirable for the data or information on the tape cartridges to be accessible or readable for years (e.g., such as seven or more years). Each company or enterprise may use large numbers of tape cartridges to store their data, and as a result, some companies' largest expense associated with data backup and archiving is the storage media itself and not the tape drives and equipment used to access the tape cartridges.

An ongoing problem in the data storage industry is how to provide advances in data storage technology such as tape drive technology while allowing data storage customers to continue to use their existing libraries of tape cartridges. For example, magnetic read/write heads are used to read data from tape and to write data to tape. There is continued pressure to increase the amount of data that can be written to the same amount of tape, e.g., a demand to increase data density on a tape cartridge. One approach to achieve this goal is to reduce the width of the write elements used to write data and more tightly place write elements on the head. The read elements then are also reduced in size to read the narrower tracks of data on the tape surfaces. Unfortunately, these new and narrower read elements often cannot effectively read data written by older or "legacy" heads (or legacy tape drives). A further complication is that code and circuitry that is used to write and to read the data from the tapes, e.g., the recording and read channels, are also changing rapidly. Hence, a new and improved tape drive may include a new read channel that is matched with the drive's recording channel, but this may result in the new tape drive being unable to read data written with a predecessor or legacy tape drive that included a predecessor or legacy recording channel. In other words, each generation of tape drive may utilize differing recording and/or read channels to store data to and retrieve data from tape, and these channels often are not wholly compatible.

This problem may be considered or labeled a lack of backward read capability or legacy read capability that is needed to support media reuse. Media reuse is important as it protects a user's investments in media and automation infrastructure (e.g., tape library systems and equipment for particular tape cartridges). Reuse is the "reclaiming" of tapes or other media that may have been written by a legacy drive or a more advanced drive, and these reclaimed tapes are rewritten by a different drive that may be advanced, or not, relative to the original drive. Backward read capability also improves data migration efficiency and helps reduce the cost of converting media to higher capacity formats of the latest generation tape drives. Unfortunately, backward read capability has proven difficult to provide as customers have tape in their libraries that was written by the prior generation of tape drive and head technology as well as tape that was written by drives belong to much earlier generations (e.g., it is not really uncommon for a single customer to have cartridges from four or more generations of tape drives). Testing has indicated that using newer, typically narrower read elements with prewritten tapes provides typically poor to bad results based on detected data error rates, and the effectiveness of the newer heads generally decreases over time as wear occurs such as due to pole tip recession. Backward read capabilities of new drives are also reduced in some cases when a read channel is configured for a particular tape surface, e.g., burnished or smoother surfaces versus rough media. Presently, the solution has typically involved maintaining legacy drives for use with legacy tapes (or for recovery operations if the legacy tapes need to be used) and/or a costly and time consuming migration of data from the legacy tapes to new media, with the legacy tapes being eventually discarded.

There remains a need for a tape drive that provides enhanced backward read capability. Preferably such a tape drive would support media reuse by reading tapes or tape cartridges that were written by previously marketed product line of tape drives. It is also desirable for such tape drives to include the next step in technology so that the tape drives are also able to read/write at higher tape capacities or provide other read/write capabilities.

SUMMARY OF THE INVENTION

The present invention addresses the above problems by providing a thin-film magnetic tape head and tape drives including such a tape head that provides legacy readers or read elements along with readers for new or advanced read processes (e.g., narrower readers). In one embodiment, a three bump head is provided that includes legacy or "wide" read elements in a middle bump with write elements (e.g., write elements for writing narrower tracks on a tape surface than the track for which the legacy read elements are adapted for sensing). In other embodiments, legacy read elements are provided in a shared shield arrangement in one or both of the outer bumps proximate to the narrow read elements associated with the write element of the middle bump (e.g., providing read verification of data written by write elements in the middle bump of the head). The tape drives of the invention may include more than a single read channel configuration to support the differing read channels and the differing sensed data (e.g., the data differs in many cases because differing recording channels were used for writing legacy tapes). For example, two sets of special purpose read channels may be provided in the control circuitry of the tape drive with a first set adapted for processing data read by the narrow read elements (e.g., the new read/write technology of the tape drive) and a second set adapted for processing data read (or data signals/values) by the legacy read elements (e.g., data written using legacy recording channels).

More particularly, a magnetic head is provided for writing and reading data on tape. The head includes write elements for writing data to in parallel tracks on a surface of a first tape. The head also includes read elements for reading the data written by the write elements. Significantly, the head also includes legacy read elements for reading data written to tracks on a surface of a second tape, with the tracks of the second tape having a width that differs from those of the first tape. The head may include a read/write surface with two outer bumps and a middle bump between the outer bumps. The read elements are positioned in the outer bumps and the write elements are provided in the middle bump. In some embodiments, the legacy read elements are provided in proximity (e.g., piggyback) and are formed in a single fabrication step or in merged-pole fabricating techniques in the middle bump (e.g., adjacent to and aligned with the write elements). "Piggyback" fabrication in this sense refers to manufacturing of heads by stacking fabricated read and/or write heads together rather than fabricating the multiple heads in a single or combined step. In other embodiments, the legacy read elements are provided in one or both of the outer bumps proximate to the read elements. The read and legacy elements differ in width, and in some embodiments, the legacy elements may have (but are not limited to) a width that is at least 10 percent larger than a width of the "narrow" read elements and more typically is at least about 50 to 100 percent or larger.

According to another aspect of the invention, a tape drive is provided for reading and writing to storage tape. The tape drive includes a three bump head with two outer read bumps and an inner write bump. The outer read bumps include readers for reading data from parallel tracks of a first width on a surface of a first storage tape while the inner write bump includes writers for writing data in the tracks of the first storage tape. Legacy readers are provided in the head to read data from tracks of a second width that is greater than the first track width on a second storage tape. In some cases, the legacy readers are provided in the inner write bump, e.g., adjacent to and aligned with the writers, but in other cases, the legacy readers are provided in one or both of the outer read bumps, e.g., adjacent to and aligned with the readers. The tape drive further includes control circuitry with a set of channels for processing data signals from the readers and a set of channels for processing data signals from the legacy readers. Each set of channels is adapted to process the differing data signals and as such typically is encoded in differing ways, e.g., with the legacy-associated channels having "legacy improvements" such as parameters that support particular error correction code, error correction, signal-to-noise ratios, pole tip recession, and/or the like.

DETAILED DESCRIPTION OF THE PREFERRED EMBODIMENTS

The present invention is directed to magnetic heads that combine newer technology read and write elements with legacy read elements (e.g., narrow read and write elements with wider read elements) to allow a single read head to be used to read narrow, dense tracks from tapes written with a new technology while also being used to read wide tracks written with predecessor tape drives and their associated recording channels. To enhance detection or processing of the differing data signals/values from the differing read elements of the same head, tape drives described herein include special-purpose read channels, with one set being encoded for processing data from the new or narrower read elements and one set being encoded or adapted for processing data from the legacy or wider read elements. In this manner, tape drives configured according to the invention provide improved backward read capabilities that increase the ability of tape storage customers to reuse or continue to use their media, which protects this investment.

Figure 1:
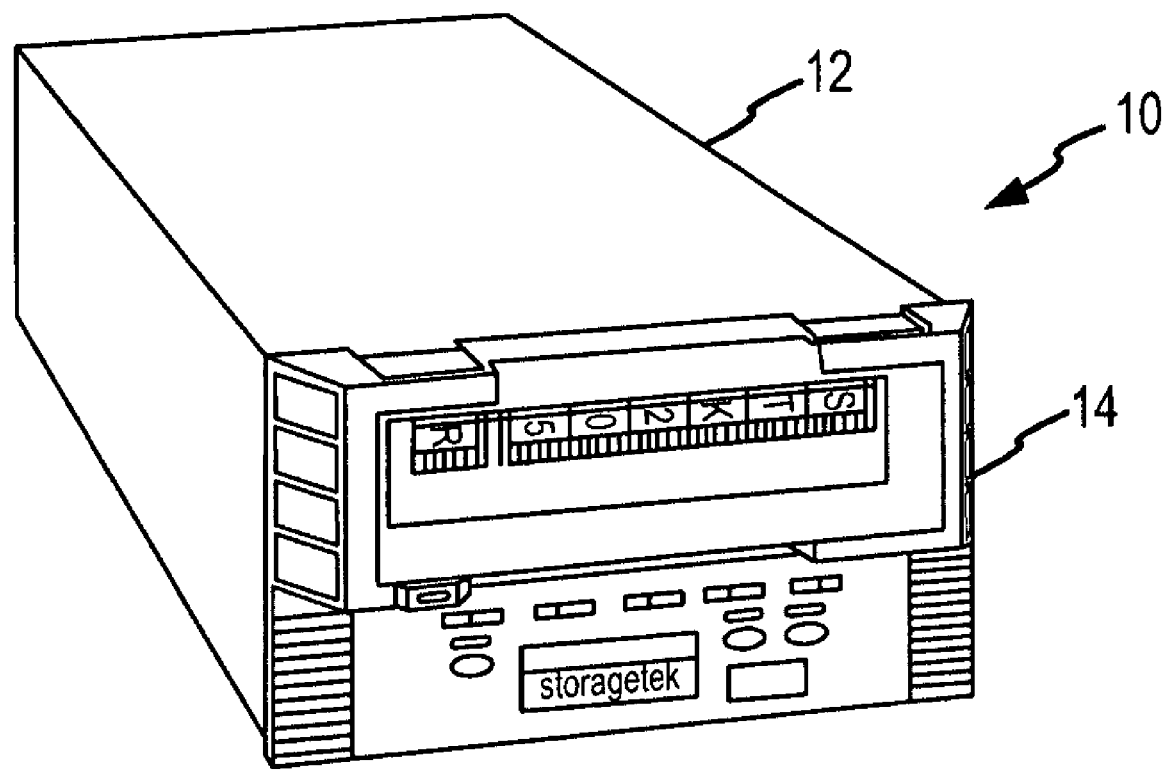
FIG. 1 is a perspective view of an exemplary tape drive of the present invention.

FIG. 1 illustrates a tape drive 10 that may be configured according to the present invention with a magnetic read/write head configured to provide backward read capability (or legacy read capability) and, in some embodiments, including read channels for selectively processing data from differing read elements (e.g., special-purpose channels that are dynamically selected based on the tape being read). The tape drive 10 includes a housing 12 that is adapted with an opening or door for receiving a magnetic tape cartridge 14 (shown inserted). The magnetic tape cartridge 14 may include legacy tape (i.e., storage media) written using a different tape drive (I.e., a legacy tape drive not shown) that utilizes legacy write or record techniques (such as a head with a different write element width and/or different recording channel) that vary from the write or record techniques employed in the tape drive 10.

The physical configuration of the tape drive and its internal drive components and arrangement are not generally limiting of the invention. Briefly, the read/write head concepts and multiple, special purpose read channel concepts of the invention may be used in nearly any tape drive that is useful for positioning a magnetic head near moving tape to read and write data and that includes control circuitry including read and record/write channels for processing and/or formatting data. For example, the tape drive may be of a single reel or dual real variety.

Figure 2:
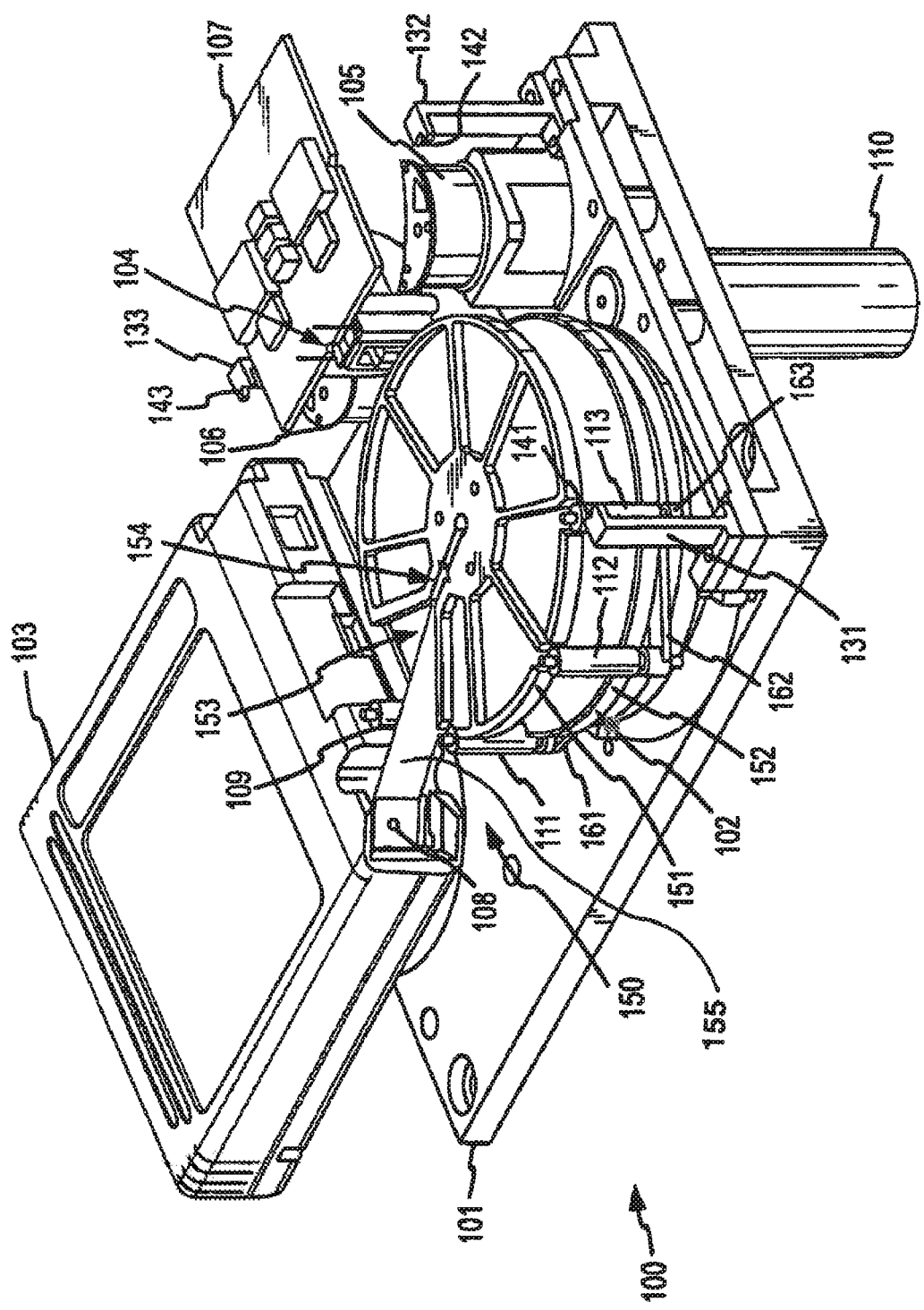
FIG. 2 is a perspective view of an exemplary tape drive that may utilize the read/write head and special-purpose read channels of the present invention with a housing removed and as it may be used to process a tape cartridge.

FIG. 2 illustrates an exemplary single reel tape drive 100 of the present invention. As shown, a tape cartridge 103 is loaded into the drive 100 with tape being positioned adjacent to a read/write head 104 that may be configured according to the present invention (see, FIGS. 3-5). The tape drive 100 further includes drive electronics or control circuitry 107 shown on a circuit board above or near the head 104, and this control circuitry 107 may include two or more read channels having special (or at least differing) purposes or functionality to support reading information from the differing read elements of the head 104 (e.g., from a new technology element and also from a legacy read element). The drive 100 is described in detail in U.S. Pat. No. 6,891,695, which is incorporated in its entirety by reference, but the following description is provided for the convenience of the reader.

FIG. 2 illustrates in perspective view the architecture of the present compact tape drive for reading and writing data on single reel magnetic tape cartridges in the magnetic tape cartridge loaded, tape ready to wrap mode and tape wrapped mode, respectively. The tape drive 100 includes a frame 101 on which is mounted the various mechanisms that implement the tape drive functionality. The tape drive 100 has a front side into which a magnetic tape cartridge 103 is loaded and a rear side. A takeup reel 150 is rotatably mounted on the frame 101 and is located at the far back corner of the tape drive 100. In addition, a data read/write apparatus made up of hydrodynamic or roller tape guides 105, 106 and read/write head 104 are located on frame 101. The takeup reel 150 and data read/write apparatus are generally located at opposite far back corners of the tape drive 100.

The tape drive 100 includes a tape elevator mechanism (not shown for simplicity of illustration) located at the front side of the frame 101 that functions to receive a magnetic tape cartridge 103 and position the received magnetic tape cartridge 103 on the tape reel drive spindle (not shown) to enable the tape drive motor to rotate the single reel located in the magnetic tape cartridge 103 to wind/unwind the magnetic tape 155 housed in the magnetic tape cartridge 103. In addition, drive electronics circuit board 107 is mounted above the read/write head 104.

The illustrated magnetic tape cartridge 103 has a front side that includes an opening through which the tape drive 100 accesses the magnetic tape 155 contained therein. Access to the magnetic tape 155 is provided by way of a leader block 108 that is attached to one end of the magnetic tape 155 that is wound on the tape reel. The tape reel is equipped with a drive spindle open to the bottom side of the magnetic tape cartridge 103, and the drive spindle is formed to mate with a supply reel drive that is part of the tape drive 100 that receives the magnetic tape cartridge 103. The takeup reel 150 includes a spool-shaped structure that uses a substantially cylindrical shaped hub (not shown) that connects a cylindrical top plate 151 and a cylindrical shaped bottom plate 152 that form the rims of the spool. The magnetic tape 155 is wound on the hub by the action of a tape wrap mechanism drive motor 110 that functions to wind the magnetic tape 155 in clockwise fashion on the hub. The takeup reel 150 includes funnel-shaped apertures 153 that are formed in the top plate 151 and the bottom plate 152 to accommodate the leader block 108 and the associated tape threading arm. The shape of these apertures 153 functions to guide the leader block 108 into position as it traverses the length of the aperture 153 into an aperture 154 that is formed in the cylindrical wall of the hub to receive the leader block 108 as it is retrieved from the magnetic tape cartridge 103. The funnel shape of these apertures 153 compensates for any misalignment of the leader block 108, as carried by the tape threading arm, with the aperture 154 that is formed in the cylindrical wall of the hub.

The read/write head assembly 104 and the hydrodynamic tape path bearings 105, 106 are positioned next to the takeup reel 150. The tape wrap mechanism is located below the takeup reel 150 and includes three arms 161-163, each of which is equipped with a tape guide roller 111-113 mounted on the distal end thereof. The tape guide rollers 111-113 are each seated in a respective cutout in the takeup reel top 151 and bottom 152 plates when in the staging mode. The tape threading arm engages the leader block 108 of the magnetic tape cartridge 103 and withdraws the leader block 108 from the magnetic tape cartridge 103, threading the magnetic tape 155 from the opening formed in the magnetic tape cartridge exterior housing to the aperture 154 formed in the hub of the takeup reel 150, where the leader block 108 is seated.

Once the leader block 108 is seated, the tape wrap drive motor 110 is activated and functions to rotate all three arms 161-163 in a clockwise direction to engage the magnetic tape 155 that is exposed between the magnetic tape cartridge 103 and the takeup reel 150. Each of the three arms 161-163 follows its own path defined by a cam or track located on the underside of the tape drive during the rotation of the arms 161-163. The arms 161-163 and their associated tape guide rollers 111-113 serve to wrap the magnetic tape 155 from the magnetic tape cartridge 103, across fixed guide roller 109, past the read/write head 104, and finally to the takeup reel 150. As the first movable tape guide roller 111 rotates in the clockwise direction around the takeup reel 150, it engages the magnetic tape 155 and begins to wrap the magnetic tape 155 across the face of fixed tape guide roller 109. In synchronization with the movement of the first tape guide roller 111 and delayed in time, the second tape guide roller 112 rotates in the clockwise direction, following the path of the first tape guide roller 111, to engage magnetic tape 155 to prevent the magnetic tape 155 from wrapping around the hub of the takeup reel 150 as the first tape guide roller III pulls the magnetic tape 155 along the length of the magnetic tape cartridge 103 to the space between the takeup reel 150 and the data read/write apparatus. Similarly, in synchronization with the movement of the first tape guide roller 111 and the second tape guide roller 112 and delayed in time, the third tape guide roller 113 rotates in the clockwise direction, following the path of the first tape guide roller 111 and second tape guide roller 112, to engage magnetic tape 155 to prevent the magnetic tape 155 from wrapping around the hub of the takeup reel 150 as the first tape guide roller 111 pulls the magnetic tape 155 along the length of the magnetic tape cartridge 103 through the space between the takeup reel 150 and the data read/write apparatus to position the magnetic tape in front of the read/write head 104 and the hydrodynamic tape guides 105, 106.

Again, the invention is not limited to the tape drive 100 and its configuration but is instead useful with nearly any tape drive in which a read/write head (such as head 104) is used for reading and writing data to tape, and, particularly, tape that may have been written to with "legacy" drives. With this in mind, the following description of heads and corresponding special-purpose read channels are intended to describe implementations that may be used as the head 104 and control circuitry 107 of the tape drive 100 of FIG. 2, in more generic tape drive 10 of FIG. 1, or in other tape drives not shown.

Generally, multi-channel magnetic heads are used in tape drives to read and write information to a magnetic tape while the tape travels in both directions relative to the head. These heads are typically manufactured using well-known thin film processes such as micro-lithography, evaporation, sputtering, ion milling, electroplating, and wet etching to produce magnetic micro-structures on one side of a substrate such as SiC, AlTiC, and ferrite. For example, a number of head architectures use thin film technology to pattern write and read elements onto a substrate, which are then subsequently machined into head bumps and glued together to align the write and read elements for bi-directional tape motion. The particular manufacturing technique is not limiting to the present invention, and the heads of the invention may be manufactured in any manner that provides the described geometry and read/write element arrangement. For example, but not as a limitation, the heads shown in the figures may be fabricated using known or developed piggyback techniques where the legacy read elements described herein are glued or otherwise attached to read or write elements provided for reading/writing using "new" technologies (e.g., a later developed technology relative to the legacy reader). Alternatively, the heads of the invention may be fabricated as merged-pole magnetic heads, and the fabrication may be performed using the processes described in detail in U.S. Pat. No. 6,826,020 to Daby et. al., which is incorporated herein by reference.

In order to write information onto a tape, read elements must be located so as to follow the track on the tape being recorded by the write elements. This is known as a read-back check and is used to ensure integrity of information written to the tape. Thus, write and read elements typically operate simultaneously but are spaced apart to control the noise problems with reading or writing. In addition to the spacing requirement, each read element is precisely aligned with a corresponding write element (as shown by the dashed line a-a in FIGS. 3 and 5), i.e., a "bump-to-bump" alignment. Proper alignment enables the head to be capable of "read-while-write" (RWW) operations to verify that the information has been written to the tape correctly as the tape is spooled through the head. With these design goals in mind, three bump heads are useful as they provide two outer bumps with read elements and a middle bump with a write element to support RWW operations when the tape is moved in either direction.

Figure 3:
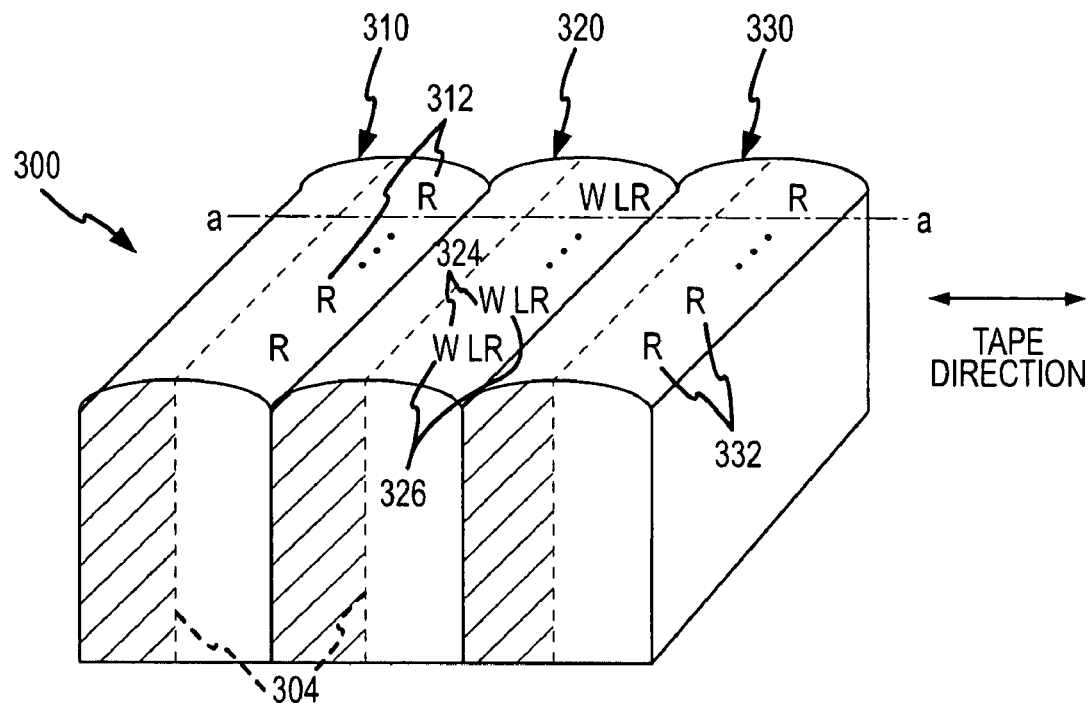
FIG. 3 is a perspective view of a three bump magnetic head according to an embodiment of the present invention showing readers and writers (or read and write elements) symbolically.

FIG. 3 illustrates a magnetic head 300 of one embodiment of the invention. The head 300 is designed for RWW operations and includes three bumps including two other bumps 310 and 330 and a middle bump 320. The head 300 is adapted to support reading and writing using a first technology (such as a new read/write technology developed for a particular tape drive) and also to support reading based on a second technology that differs from the first (such as a legacy technology). To this end, the outer bumps 310, 330 include a number of read elements 312, 332 that are denoted by the symbol "R" in FIG. 3. The inner or middle bump 320 is sandwiched between outer bumps 310, 330 and includes a matching number of write elements 324 denoted by the symbol "W" in the figure. For example, some implementations of the head 300 will include 1 to 16 or more read elements 312, 332 and write elements 324 in each bump 310, 320, 330, with one preferred embodiment including 16 elements in each bump. The new technology read and write elements 312, 324, 332 are aligned as shown by alignment line a-a.

The head 300 is adapted not only for reading and writing with read elements 312, 332 and write elements 324, which are typically configured (such as with a particular width) for supporting new technology of a tape drive (such as denser data on tape) but it is also adapted for read back capability or legacy reads. In other words, the head 300 is adapted for reading tracks in a tape that were written with a writer other than writer 324, and this different writer typically would have included a wider write pole. Specifically, the head 300 includes a number of legacy readers or read elements 326 (shown by the symbol "LR") in the middle bump 320.

The positioning of the legacy readers 326 may be essentially adjacent and/or aligned with the writers 324 and the number of legacy readers 326 may match the number of writers 324 as shown in FIG. 3. However, the head 300 is adapted for reading legacy tapes (not shown in FIG. 3). Hence, the number and positioning of the legacy readers 326 is preferably selected to match the number and positioning of writers on a legacy head (not shown). In some embodiments, the number of legacy readers 326 is 16 (but a smaller or larger number may be provided). As discussed above, the head 300 may be formed as a merged-pole head or may be formed using piggyback techniques (e.g., fabrication involving stacking together heads and not fabricating in a single step) that are controlled to provide desired positioning and alignment of both the first or new technology readers 312, 332 and writers 324 and also the "add-on" legacy readers 326.

As with manufacturing of the head 300, the specific design and configuration of the readers 312, 326, 332 and writers 324 is not considered limiting of the invention and nearly any reader or writer (or combination) may be used that is useful for reading and writing data to storage media such as tape. These elements may include combined thin film magnetic read-write transducers where the read element is a magneto-resistive film or a giant magneto-resistive film. In such an embodiment, the magneto-resistive film and giant magneto-resistive film magnetic read transducer structures typically include a magnetically sensitive film disposed between insulating layers that in turn are flanked by magnetic shields. The process for fabrication of a combined thin film transducer may begin with fabricating the magnetic read transducer and then transitioning into the magnetic write transducer, with it being common for the insulating layer and shield layer above the magnetically sensitive film to double as a base layer and a bottom write pole of the magnetic write transducer.

Figure 4:
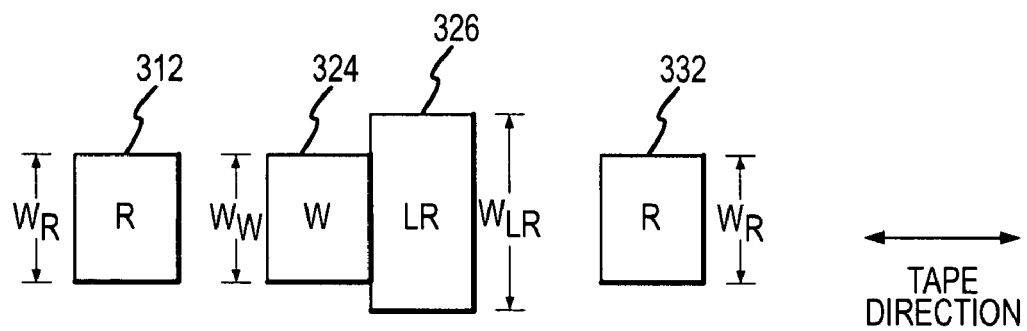
FIG. 4 shows a block diagram showing the relative widths of read and write elements of an embodiment of the invention such as may be used in the head of FIG. 3.

FIG. 4 shows in block form a portion of a head such as head 300 of FIG. 3. FIG. 3 is useful for illustrating the size or width of the readers and writers. As shown, the readers 312, 332 of the outer bumps have a first reader width, $W_R$, that is selected to support reading of data written in tracks of a tape by writer 324 in the middle bump. The writer 324 has a width, $W_W$, and typically, the width of the readers, $W_R$, is based on the width of the writer, $W_W$, and is generally less than this width (e.g., $W_R$ is typically one half that of $W_W$ and within an acceptable range or tolerance to facilitate effective or low error rate reading), such as a width less than 20 micrometers but more typically about 6 micrometers when the writer width (or the tracks it writes) are 20 micrometers or less and in some cases, about 18 micrometers being an exemplary width for the newer technology write tracks.

In contrast, the legacy reader 326 in the middle bump has a width or second reader width, $W_{LR}$, that is chosen to support reading of data written by a legacy writer (not shown), which typically would have a larger width. As a result, the second reader width, $W_{LR}$, is in most embodiments of the invention substantially larger than the first reader width, $W_R$, (such as for reading write tracks greater than 18 micrometers (i.e., the new track width) and with some legacy tracks being twice as large or, in this case, 36 micrometers or larger). The specific second reader width, $W_{LR}$, being selected based on prior generation legacy writers (e.g., to be about half the width of the legacy writers or the like). In some embodiments, the legacy reader 326 is designed based on a single writer element and its width, $W_{LR}$, is selected to correspond to that legacy writer. In other cases, the legacy reader 326 is designed for reading two or more earlier generation writers, and in these cases, the legacy reader 326 may have a width that is larger than some legacy readers but smaller than others to provide effective reading of multiple legacy writer configurations (e.g., with the readers typically being smaller than the writers). The widths may be actual measurements of write pole and read elements/gaps or may be representative of effective read/write widths of the readers 312, 326, 332 and writer 324.

Figure 5:
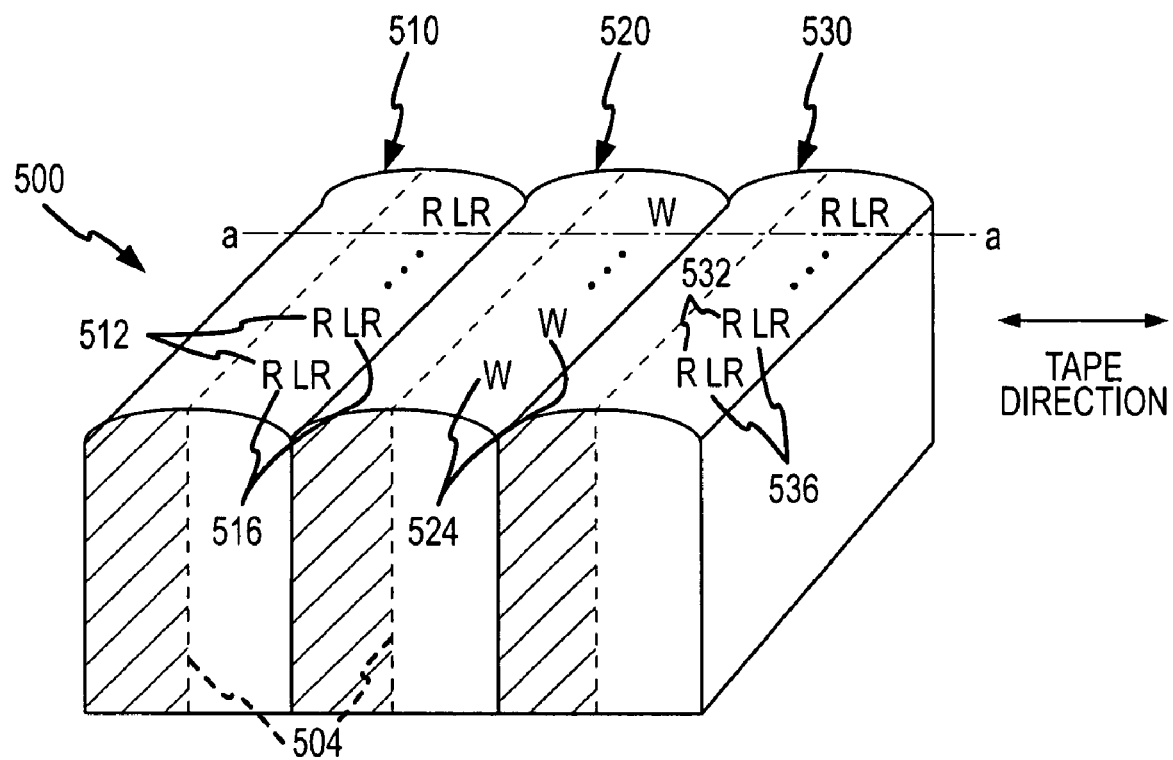
FIG. 5 is similar to FIG. 3 and illustrates a perspective view of a three bump magnetic head according to another embodiment of the invention.

FIG. 5 illustrates a head 500 of another embodiment of the invention. The head 500 is similar to that of head 300 in that it has three bumps 510, 520, and 530. The outer bumps 510, 530 include readers 512, 532 that are designed for reading data on a tape written by the writer 524 provided in the middle bump 520. Typically, these readers and writers 512, 532 and 524, respectively, are designed for reading and writing tracks having a first width, e.g., corresponding to a newer tape drive technology and typically being narrower than legacy tape tracks. The arrangement on the bumps 510, 520, 530 (e.g., alignment as shown with line a-a and gap lines shown at dashed lines 504) allows the head 500 to be used for bidirectional writing with subsequent read verification but alignment of the read and write heads is often not required or provided in these heads and is not a limitation of head 500 (and other heads of the present invention).

In contrast to head 300, the head 500 provides outer bumps 510 and 530 that combine legacy readers 516 and 536 with readers 512, 532 to read prior generation written tapes. As with head 300, the legacy readers 516, 536 are selected to have a number and position on the head 500 (e.g., along the bump 510, 530 transverse to the tape direction) that corresponds with written tracks in legacy tapes. This may result in the number of legacy readers 516, 536 matching the number and position of the new generation readers 512, 532 or being different. As with head 300, the legacy readers 516, 536 have a differing effective read width than the width of new generation readers 512, 532 (which have widths selected to support writer 524). In some cases, the width of the legacy readers 516, 536 may be substantially twice that of the readers 512, 532 with the specific width selected based on the legacy track width to be read by head 500.

The outer bumps 510, 530 may be provided using a shared shield design. This design allows to readers to be provided on each of these bumps 510, 530 so that the reader bumps 510, 530 are capable of reading tapes of a later version tape drive (i.e., written by write bump 520) and also contain legacy readers 516, 536 for reading legacy written tape cartridges. According to yet another embodiment of the invention, while not shown, the shared shield may be used in only one of the outer bumps 510 or 530 by providing legacy readers 516 or 536 (or sensors for reading legacy tape) in only one of these bumps 510 or 530.

In addition to the combined new technology/legacy technology heads, enhanced reading of legacy tapes with a new technology or later version tape drive is facilitated according to the invention with special-purpose read channels. Briefly, to make reading of data with the legacy readers of the heads 300, 500 more accurate, the invention involves providing control circuitry for tape drives that includes legacy read channels in the data processing circuitry for reading data from the legacy readers rather than attempting to utilize read channels that are configured for processing data from the later generation readers.

Figure 6:
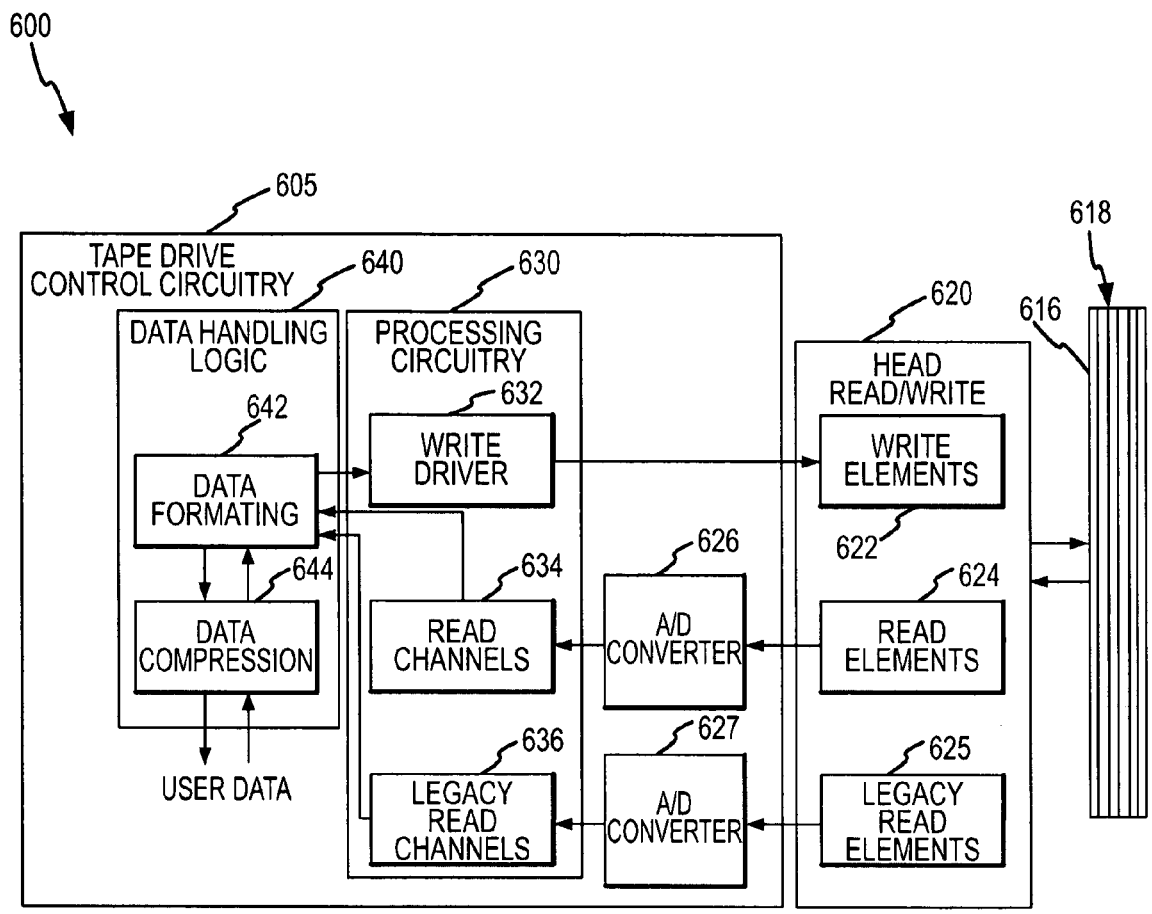
FIG. 6 is a block diagram of a tape drive of the present invention showing components of a tape drive control circuitry.

For example, a tape drive 600 is shown schematically in FIG. 6 as it may be used for reading tape or storage media 616 with its plurality of parallel, written tracks 618. To this end, the tape drive 600 includes a tape drive control circuitry 605 and a read/write head 620 that is positioned near or contacting the tape 616. The head 620 (which may take the form of a three bump head as shown in FIGS. 3 and 5 or in the one shared shield outer bump embodiment) is adapted for writing and reading to one read/write technology with write elements 622 and corresponding read elements 624. The head 620 also has backward read or legacy read capabilities and includes legacy read elements 625, which may be piggybacked onto write or read elements 622, 624 or provided via a merged pole design.

The control circuitry 605 processes user data including writing data to tape 616 and reading data from tape 616, and the circuitry 605 may take numerous forms to practice the invention. As shown, analog signals read by the read elements 624 and 625 are converted to a series of digital values by A/D converters 626 and 627 and provided to processing circuitry 630. The processing circuitry 630 interfaces with the tape head components and includes a write driver 632 for encoding data to be written to the tape 616 by write elements 622.

Additionally, the processing circuitry 630 functions to decode the digital signals from the read elements 624, 625. To provided more effective processing, read channels specially configured or designed for each set of read elements 624, 625 is provided in the processing circuitry 630. As shown, read channels 634 are provided that are adapted for processing digital signals from read elements 624 (e.g., the newer technology read/write capabilities), and legacy read channels 636 are provided that are adapted for processing digital signals from legacy read elements 625. In other words, the processing circuitry 630 includes "special-purpose read channels" that are matched to the differing read elements 624, 625 and the data that each of these sets of elements 624, 625 is intended to read from tape 616 (i.e., new technology data or legacy data that may have been recorded using differing protocols). For example, read channels 634, 636 may both be partial response maximum likelihood (PRML) equalization/detection channels but be configured differently such as with legacy read channels including "legacy improvements or differences" that allow it to more effectively process the data signals from legacy read elements 625. In some preferred embodiments, the legacy read channels 636 will not simply be a read channel from a legacy tape drive but will be a channel specially configured (e.g., with a unique ASIC adapted for particular legacy device or devices) for reading a particular legacy written tape of one or more generations of tape drives. The control circuitry 605 further includes data handling logic 640 that provides data formatting with module 642 and data compression module 644. Although not shown, a detector may be included in the tape drive 600 that acts to detect or read a format indicator block of the tape 616 to allow the control circuitry 605 to dynamically determine if the tape 616 is legacy tape that should be read using legacy read elements 625 and legacy read channels 636 or with read elements 624 and read channels 634 associated with later technologies.

Figure 7:
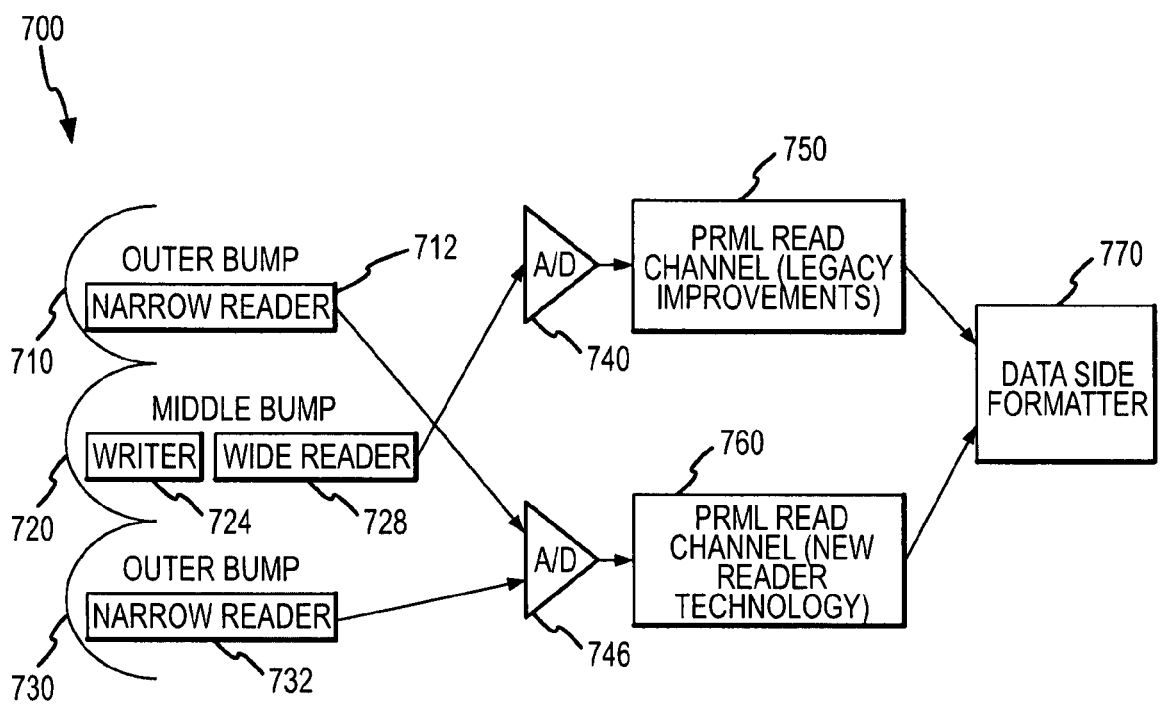
FIG. 7 illustrates in block form components of a tape drive of an embodiment of the invention showing the pairing or matching of readers with special-purpose read channels.

FIG. 7 illustrates another tape drive 700 of the invention in more simplified form. As shown, a three bump head is provided that includes outer read bumps 710, 730 with narrow (or newer technology) readers 712, 732 and a middle bump 720 with a writer 724 corresponding to readers 712, 732. Further, the middle bump 720 includes a wide reader (or legacy reader) 728 that is adapted for reading tape tracks that are wider than those readable by the narrow readers 712, 732. Each of the readers 712, 732 of the outer read bumps 710, 730 is associated with NO converter 746 and a first PRML read channel 760 that is configured for processing/detecting data written according to a first or new technology (and its associated recording protocols or encoding) (e.g., a VR2 PRML channel available from Sun Microsystems, Inc.). In contrast, the wide or legacy reader 728 of the middle write bump 720 is associated with (or provides its data signals to) an A/D converter 740 and a second PRML read channel 750 that is configured for processing/detecting data written to a second or legacy technology or technologies (and its associated recording protocols or encoding by a write driver/data formatting module), e.g., reading not only PRML written data but, in some cases, data recorded with predecessor drives that used peak detection recording channels. The modifications or "legacy improvements" may include providing read channel parameters to address to account for pole tip recession in worn heads and increased signal to noise ratio (SNR). Additionally, the legacy improvements may include providing differing error correction code (ECC) and/or error correction in the legacy read channel 750 compared with the read channel 760. Both read channels 750 and 760 provide their processed or detected data signals/values to a data side formatter 770 (e.g., a DSFP or the like).

In one specific implementation, the legacy read elements and legacy read channels are configured and selected to support reading of tapes or tape cartridges written using T9840A, T9840B, and/or T9840C tape drives while the "new technology" read and write elements and channels are configured to support read and write technologies provided with the T9840D or later series tape drives, with the T9840x series of tape drives being distributed by Storage Technology Corporation (now, Sun Microsystems, Inc.).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the figures illustrate three bump heads as being useful to implement the invention. It will be understood that the concepts of the invention could just as readily be implemented in a single bump (or in other heads with differing bump numbers and arrangements). These heads are believed to be within the breadth of the above description and following claims. Also, the features of the invention were explained in the above examples for use with tape and in tape drives but, of course, those skilled in the arts will understand that the invention and its features are applicable to other forms of data storage media and the components used for reading and writing to such media (e.g., optical, holographic, and other forms of data storage and media).

We claim:

1. A magnetic head for writing and reading data on data storage media, comprising:
    a plurality of write elements for writing data to a plurality of parallel data tracks on a surface of a first media, each of the data tracks having a first width;
    a plurality of read elements for reading the data written by the write elements from the data tracks of the first media; and
    a plurality of legacy read elements for reading data written to data tracks on a surface of a second media, wherein the tracks of the second media have a second width different than the first width.

2. The head of claim 1, further comprising a read/write surface with two outer bumps and a middle bump between the outer bumps, wherein the read elements are provided in the outer bumps and the write elements and the legacy read elements are provided in the middle bump.

3. The head of claim 1, further comprising a read/write surface with two outer bumps and a middle bump between the outer bumps, wherein the read elements are provided in the outer bumps, the write elements are provided in the middle bump, and the legacy read elements are provided in at least one of the outer bumps.

4. The head of claim 1, wherein the media comprises tape.

5. The head of claim 1, wherein the second width is greater than the first width.

6. The head of claim 5, wherein the number of legacy read elements is equivalent to the number of write elements.

7. The head of claim 1, wherein the legacy read elements are provided adjacent to the write elements and are aligned with the write elements.

8. A tape drive for reading and writing data to data tracks on a storage tape, comprising:
    a three bump head with two outer read bumps and an inner write bump, wherein the outer read bumps each comprise readers for reading data from parallel data tracks of a first width on a surface of a first storage tape and the inner write bump comprises writers for writing data in the data tracks of the first width and wherein the three bump head comprises legacy readers for reading data from parallel data tracks of a second width greater than the first width on a surface of a second storage tape; and
    control circuitry comprising a first set of read channels for processing data signals from the readers and a second set of read channels for processing data signals from the legacy readers.

9. The tape drive of claim 8, wherein the first set of read channels is encoded differently than the second set of read channels.

10. The tape drive of claim 8, wherein the legacy readers are provided in the inner write bump adjacent to the writers.

11. The tape drive of claim 8, wherein the legacy readers are provided in one of the outer read bumps adjacent to the readers in the one of the outer read bumps.

12. The tape drive of claim 8, wherein the legacy readers are provided in both of the outer read bumps with one of the legacy readers positioned adjacent to each of the readers.

13. The tape drive of claim 8, wherein the three bump head is fabricated as a merged pole head with the legacy readers in provided in one of the bumps with the readers or the writers.

14. The tape drive of claim 8, wherein the second width is at least about 10 percent larger than the first width.

15. A system for reading and writing to tape written with differing data track widths and recording channels, comprising:
    a thin-film magnetic head comprising write elements with a first width as measured transverse to a tape direction in the tape drive system, first read elements configured for reading data from a tape written by the write elements, and second read elements configured for reading data from a tape written by write elements with a second width larger than the first width, wherein the first and second read elements are separate; and
    a plurality of read channels processing data sensed by the first and second read elements, wherein the plurality of read channels comprise a first set of channels processing data from the first read elements and a second set of channels processing data from the second read elements.

16. The system of claim 15, wherein the second set of channels comprises peak detect channels or partial response maximum likelihood (PRML) channels with parameters selected based on recording channels used to write the data onto the tape written by the write elements with the second larger width.

17. The system of claim 15, wherein the write elements are provided in a first bump on a surface of the thin-film magnetic head and the first read elements are provided in a second and third bump sandwiching the first bump.

18. The system of claim 17, wherein the second read elements are provided in the first bump proximate to the write elements.

19. The system of claim 17, wherein the second read elements are positioned in at least one of the second or third bumps proximate to the read elements in the bump.

* * * * *